United States Patent
Chen et al.

(10) Patent No.: US 11,039,163 B2
(45) Date of Patent: Jun. 15, 2021

(54) ADAPTING MERGE CANDIDATE POSITIONS AND NUMBERS ACCORDING TO SIZE AND/OR SHAPE OF PREDICTION BLOCK

(71) Applicant: MEDIATEK INC., Hsinchu (TW)

(72) Inventors: Chun-Chia Chen, Hsinchu (TW); Chih-Wei Hsu, Hsinchu (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/654,914

(22) Filed: Oct. 16, 2019

(65) Prior Publication Data
US 2020/0053380 A1    Feb. 13, 2020

Related U.S. Application Data

(63) Continuation of application No. 15/874,650, filed on Jan. 18, 2018, now Pat. No. 10,484,703.
(Continued)

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/107* (2014.11);
(Continued)

(58) Field of Classification Search
CPC .... H04N 19/52; H04N 19/105; H04N 19/107; H04N 19/139; H04N 19/176; H04N 19/96
See application file for complete search history.

(56) References Cited

U.S. PATENT DOCUMENTS 9,253,498 B2    2/2016  Lee
9,288,493 B2    3/2016  Oh
(Continued)

FOREIGN PATENT DOCUMENTS

| CN | 102665079 A | 9/2012 |
| CN | 105723713 A | 6/2016 |
| WO | WO 2017039117 A1 | 3/2017 |

OTHER PUBLICATIONS

Brass B., Helle P. Lakshman H., Ugur K. (2014) Inter-Picture Prediction in HEVC. In: Sze V., Budagavi M., Sullivan G. (eds) High Efficiency Video Coding (HEVC). Integrated Circuits and Systems. Springer, Cham, https://doi.org/10.1007/978-3-319-06895-4_5 (Year: 2014).*

(Continued)

*Primary Examiner* — Jamie J Atala
*Assistant Examiner* — Michael Robert Cammarata
(74) *Attorney, Agent, or Firm* — Oblon, McClelland, Maier & Neustadt, L.L.P.

(57) ABSTRACT

Aspects of the disclosure provide a method for video coding in merge mode or skip mode. The method can include receiving a prediction block (PB) of a picture, determining number and positions of merge candidates of the PB according to a size and/or a shape of the PB, and constructing a candidate list including motion data of a subset of the merge candidate positions.

12 Claims, 11 Drawing Sheets

Related U.S. Application Data

(60) Provisional application No. 62/455,623, filed on Feb. 7, 2017.

(51) Int. Cl.
*H04N 19/96* (2014.01)
*H04N 19/139* (2014.01)
*H04N 19/176* (2014.01)
*H04N 19/107* (2014.01)

(52) U.S. Cl.
CPC ......... *H04N 19/139* (2014.11); *H04N 19/176* (2014.11); *H04N 19/96* (2014.11)

(56) References Cited

U.S. PATENT DOCUMENTS

| | | |
|---|---|---|
| 9,843,803 B2 | 12/2017 | Lim |
| 9,866,859 B2 | 1/2018 | Zhou |
| 10,200,712 B2 | 2/2019 | Ikai |
| 2012/0134416 A1 | 5/2012 | Lin |
| 2012/0236942 A1 | 9/2012 | Lin |
| 2012/0320984 A1 | 12/2012 | Zhou |
| 2013/0195188 A1* | 8/2013 | Sugio ................... H04N 19/132 375/240.14 |
| 2013/0287116 A1* | 10/2013 | Helle .................... H04N 19/70 375/240.24 |
| 2013/0308708 A1* | 11/2013 | Sugio .................... H04N 19/51 375/240.24 |
| 2014/0307789 A1 | 10/2014 | Kim |
| 2014/0341284 A1 | 11/2014 | Kim |
| 2014/0355687 A1 | 12/2014 | Takehara et al. |
| 2016/0316221 A1 | 10/2016 | Ikai |
| 2016/0323597 A1* | 11/2016 | Takehara ............. H04N 19/105 |
| 2017/0332099 A1* | 11/2017 | Lee ........................ H04N 19/52 |
| 2019/0028703 A1 | 1/2019 | Tamse |
| 2019/0200010 A1 | 6/2019 | Kim |
| 2019/0200040 A1* | 6/2019 | Lim .................... H04N 19/583 |
| 2019/0394465 A1* | 12/2019 | Moon ................. H04N 19/105 |
| 2020/0045306 A1* | 2/2020 | Lee ...................... H04N 19/105 |
| 2020/0107016 A1* | 4/2020 | Li ........................ H04N 19/105 |

OTHER PUBLICATIONS

International Search Report and Written Opinion of the International Searching Authority dated Apr. 18, 2018 in PCT/CN2018/075014 filed Feb. 2, 2018, 10 pages.

Combined Taiwanese Office Action and Search Report dated Feb. 27, 2019 in Patent Application No. 107102187 (with English translation of categories of cited documents), 6 pages.

* cited by examiner

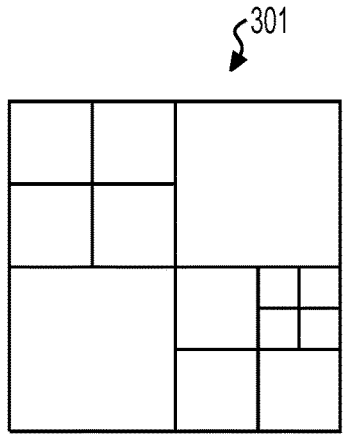
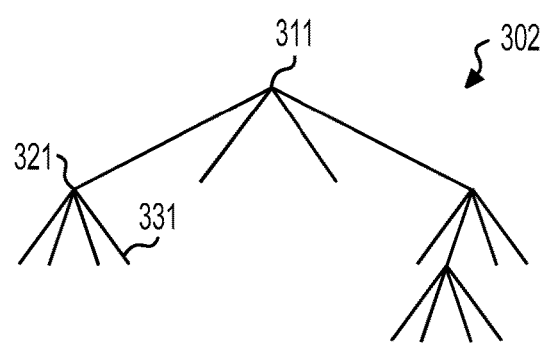
FIG. 3A
*(prior art)*
FIG. 3B
*(prior art)*
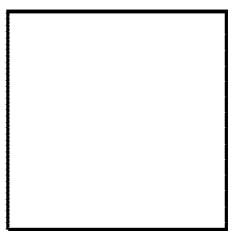
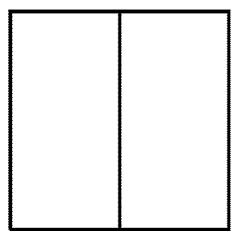
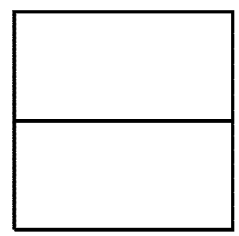
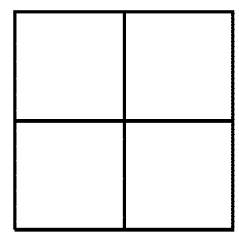
M X M  |  M/2 X M  |  M X M/2  |  M/2 X M/2
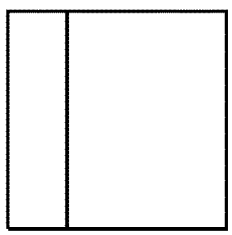
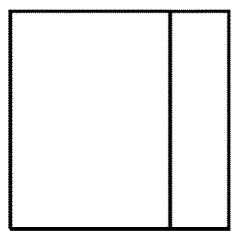
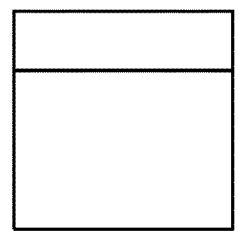
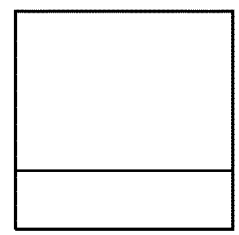
M/4 X M (LEFT)  |  M/4 X M (RIGHT)  |  M X M/4 (UP)  |  M X M/4 (DOWN)
FIG. 3C
*(prior art)*

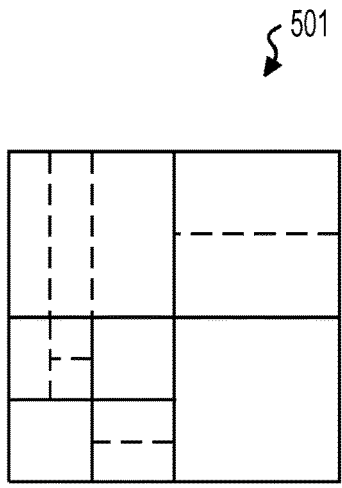
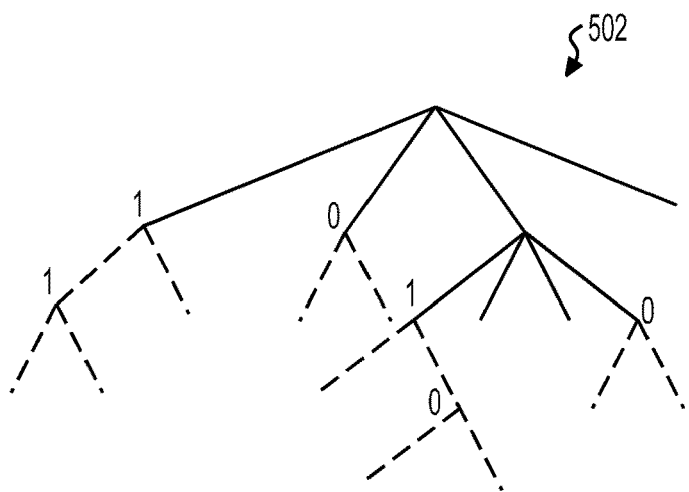
FIG. 5A
*(prior art)*
FIG. 5B
*(prior art)*
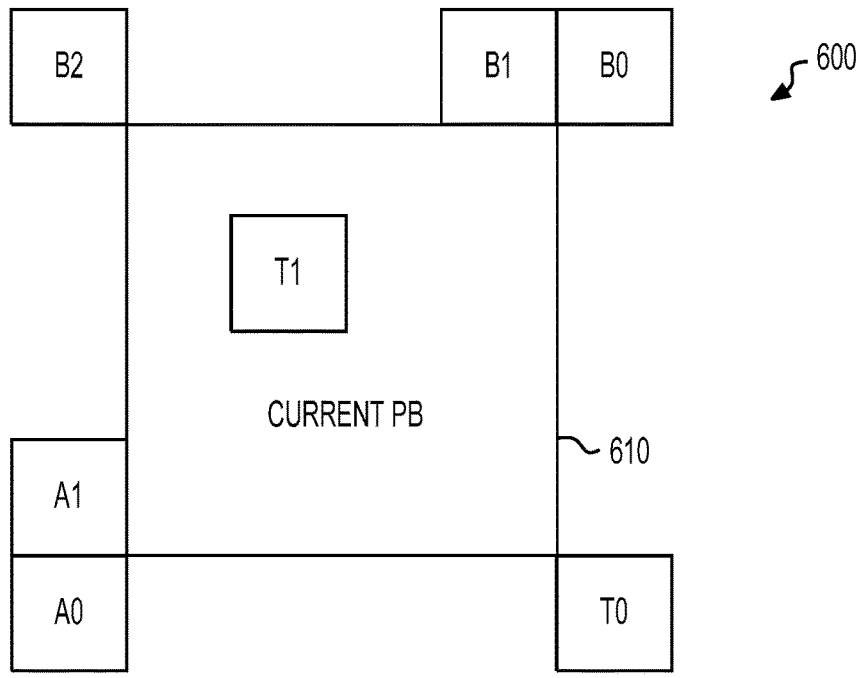
FIG. 6
*(prior art)*

US 11,039,163 B2

ADAPTING MERGE CANDIDATE POSITIONS AND NUMBERS ACCORDING TO SIZE AND/OR SHAPE OF PREDICTION BLOCK

INCORPORATION BY REFERENCE

This present disclosure is a continuation of U.S. application Ser. No. 15/874,650, filed Jan. 18, 2018, which claims the benefit of U.S. Provisional Application No. 62/455,623, "Variation Based Method for Video Coding in Merge Mode" filed on Feb. 7, 2017, each of which is incorporated herein by reference in its entirety.

TECHNICAL FIELD

The present disclosure relates to video coding techniques.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In image and video coding, pictures and their corresponding sample arrays can be partitioned into blocks using tree structure based schemes. Then, each block can be processed with one of multiple processing modes. Merge mode is one of such processing modes in which spatially or temporally neighboring blocks can share a same set of motion parameters. Encoders and decoders follow the same rule to construct the prediction candidate list, and an index indicating the selected prediction candidate is transmitted from an encoder to a decoder. As a result, motion vector transmission overhead can be reduced.

SUMMARY

Aspects of the disclosure provide a method for video coding in merge mode or skip mode. The method can include receiving a prediction block (PB) of a picture, determining number and positions of merge candidates of the PB according to a size and/or a shape of the PB, and constructing a candidate list including motion data of a subset of the merge candidate positions.

In an embodiment, a number of merge candidates on one side of the PB is determined according to a side length of the respective side. In an embodiment, a number of merge candidates on one side of the PB is determined according to a width-height ratio of the PB. In an embodiment, positions of merge candidates on one side of the PB is determined to be positions that substantially equally divide the respective side. In an embodiment, when a merge candidate at one of the determined positions is not available, a search is performed to look for a candidate near the unavailable merge candidate.

In one example, the positions of the merge candidates of the PB include candidate positions on two opposite sides of the PB that interleave with each other. In various examples, the merge candidates of the PB include spatial and temporal candidates.

Aspects of the disclosure provide an apparatus for video coding in merge mode or skip mode. The apparatus can include circuitry configured to receive a prediction block (PB) of a picture, determine number and positions of merge candidates of the PB according to a size and/or a shape of the PB, and construct a candidate list including motion data of a subset of the merge candidate positions.

Aspects of the disclosure provide a non-transitory computer-readable medium that stores instructions implementing the method for video coding in merge mode or skip mode.

BRIEF DESCRIPTION OF THE DRAWINGS

Various embodiments of this disclosure that are proposed as examples will be described in detail with reference to the following figures, wherein like numerals reference like elements, and wherein:

FIGS. 3A-3C show a first tree-based partitioning schemes for partitioning a picture according to an embodiment of the disclosure;

FIGS. 5A-5B show a third tree-based partitioning schemes for partitioning a picture according to an embodiment of the disclosure;

FIG. 6 shows a first conventional method for defining candidate positions for merge mode processing;

DETAILED DESCRIPTION OF EMBODIMENTS

Figure 1:
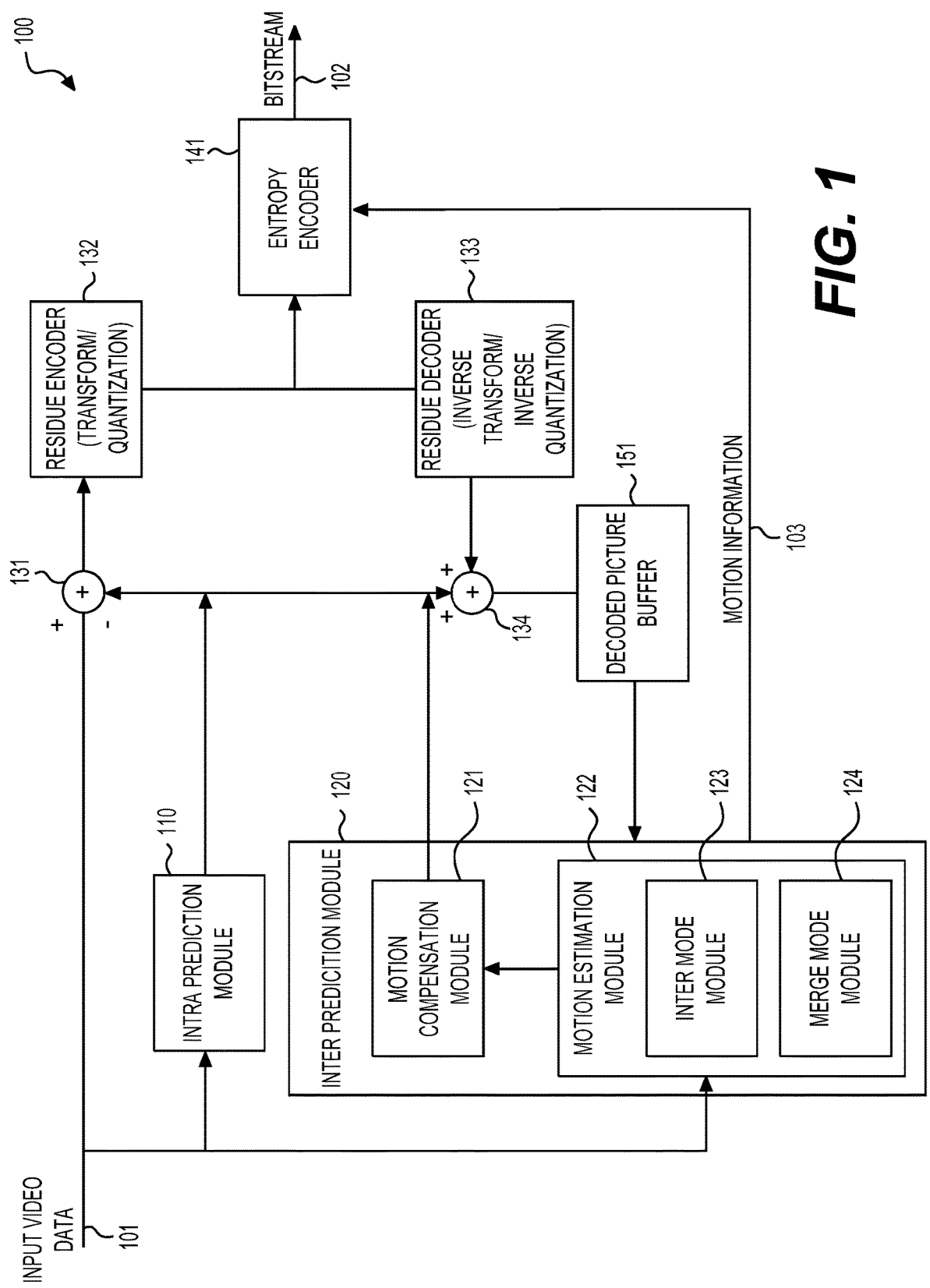
FIG. 1 shows an example video encoder according to an embodiment of the disclosure.

FIG. 1 shows an example video encoder 100 according to an embodiment of the disclosure. The encoder 100 can include an intra prediction module 110, an inter prediction module 120, a first adder 131, a residue encoder 132, an entropy encoder 141, a residue decoder 133, a second adder 134, and a decoded picture buffer 151. The inter prediction module 120 can further include a motion compensation module 121, and a motion estimation module 122. Those components can be coupled together as shown in FIG. 1.

The encoder 100 receives input video data 101 and performs a video compression process to generate a bitstream 102 as an output. The input video data 101 can include a sequence of pictures. Each picture can include one or more color components, such as a luma component or a chroma component. The bitstream 102 can have a format compliant with a video coding standard, such as the Advanced Video Coding (AVC) standards, High Efficiency Video Coding (HEVC) standards, and the like.

The encoder 100 can partition a picture in the input video data 101 into blocks, for example, using tree structure based partition schemes. The resulting blocks can then be processed with different processing modes, such as intra prediction mode, inter prediction with inter mode, inter prediction with merge mode, inter prediction with skip mode, and the like. In one example, when a currently being processed block, referred to as a current block, is processed with merge mode, a neighboring block will be selected from a neighborhood of the current block and a neighborhood of a collocated block of the current block. The current block can be merged with the selected neighboring block, and share motion data of the selected neighboring block. This merge mode operation can be performed over a group of neighboring blocks such that a region of neighboring blocks can be merged together, and share a same set of motion data. During transmission, only an index indicating the selected neighboring block is transmitted for the merged region, thus improving transmission efficiency.

In the above example, the neighboring block, which is to be merged with the current block can be selected from a set of predefined candidate positions of the current block, in which the candidate positions comprises one or more spatial candidate positions and/or one or more temporal candidate positions. Each spatial candidate position is associated with a spatial neighboring block surrounding the current block, and the spatial neighboring block is located at the current picture comprising the current block. Each temporal candidate position is associated with a temporal neighboring block, and the temporal neighboring block is located at a reference picture comprising the collocated block of the current block and is surrounding, overlapping, or within the collocated block of the current block. Neighboring blocks at the candidate positions (referred to as candidate blocks) are a subset of all spatial neighboring blocks of the current block and all temporal neighboring blocks of the current block. In this way, candidate blocks can be evaluated for selection of a to-be-merged block instead of the whole set of neighboring blocks.

Generally, partition of a picture can be adaptive to local content of the picture. Accordingly, resulting blocks can have variable sizes and shapes at different locations of the picture. According to an aspect of the disclosure, the encoder 100 can employ an adaptive candidate position approach to define and determine candidate positions of candidate blocks for merge mode processing. Specifically, number and location of candidate positions can be adaptively defined according to a size and/or shape of a current block. For example, a larger current block can have more number of candidate positions along its sides than a smaller current block. Based on predetermined definitions, during merge mode processing of a current block, number and location of candidate positions can be determined based on size and/or shape of the current block.

In conventional video coding techniques, numbers and locations of candidate positions are usually predefined and fixed for different blocks even shapes and sizes of the blocks vary significantly. Compared with the conventional fixed candidate position techniques, the adaptive candidate position approach can provide more and better merge candidates for a current block, leading to higher rate-distortion performance of the encoder 100.

In FIG. 1, the intra prediction module 110 can be configured to perform intra prediction to determine a prediction for a current block during the video compression process. The intra prediction can be based on neighboring pixels of the current block within a same picture as the current block.

The inter prediction module 120 can configured to perform inter prediction to determine a prediction for a current block during the video compression process. For example, the motion compensation module 121 can receive a set of motion data of the current block from the motion estimation module 122. In one example, the motion data can include horizontal and vertical motion vector displacement values, one or two reference picture indices, and optionally an identification of which reference picture list is associated with each index. Based on the motion data and one or more reference pictures stored in the decoded picture buffers 251, the motion compensation module 121 can determine a prediction for the current block.

The motion estimation module 122 can be configured to determine the set of motion data for the current block. Specifically, the current block can be processed either with an inter mode or a merge mode at the motion estimation module 122. The inter mode module 123 can be configured to perform operations of the inter mode. For example, the inter mode module 123 can perform a motion estimation process searching for a reference block similar to the current block in one or more reference pictures. Such a reference block can be used as the prediction of the current block. In one example, one or more motion vectors and corresponding reference pictures can be determined as a result of the motion estimation process depending on unidirectional or bidirectional prediction method is used. For example, the resulting reference pictures can be indicated by reference picture indices and, in case of bidirectional prediction is used, corresponding reference picture list identifications.

The merge mode module 124 is configured to perform operations of the merge mode to determine the set of motion data of the current block. For example, the merge mode module 124 can first determine numbers and locations of candidate positions of candidate blocks for the merge mode, and subsequently select one to-be-merged neighboring block from the candidate positions. For example, a candidate list can be constructed based on the candidate positions. The candidate list can include multiple entries. Each entry can include motion data of a corresponding candidate block. Each entry can then be evaluated and a set of motion data having highest rate-distortion performance can be determined to be shared by the current block. Then, the to-be-shared motion data can be used as the set of motion data of the current block. In addition, an index of the entry including the to-be-shared motion data in the candidate list can be used for indicating and signaling the selection. Such an index is referred to as a merge index.

The set of motion data of the current block determined at the inter mode module 123 or the merge mode module 124 can be supplied to the motion compensation module 121. In addition, motion information 103 related with the motion data can be generated and provided to the entropy encoder 141, and subsequently signaled to a video decoder. For the inter mode, the resulting motion data can be provided to the entropy encoder 141. For the merge mode, a merge flag can be generated and associated with the current block indicating the current block being processed with merge mode. The merge flag and a corresponding merge index can be included in the motion information 103 and signaled to the video decoder. The video decoder can derive the set of motion data based on the merge index when processing the same current block with merge mode.

In alternative examples, skip mode can be employed by the inter prediction module 120. For example, in skip mode, a current block can be predicted using inter mode or merge mode similarly as described above to determine a set of motion data, however, no residue is generated or transmitted. A skip flag can be associated with the current block. The skip flag and an index indicating the related motion information of the current block can be signaled to a video decoder. At the video decoder side, a prediction (a reference block) determined based on the related motion information can be used as a decoded block without adding residue signals. Thus, the adaptive candidate position approach can be utilized in combination with skip mode. For example, after operations of merge mode have been performed on a current block, and related motion information (merge index) has been determined, a skip mode flag can be associated with the current block to indicate the skip mode.

Multiple processing modes are described above, such as intra prediction mode, inter prediction with inter mode, inter prediction with merge mode, and inter prediction with skip mode. Generally, different blocks can be processed with different processing modes, and a mode decision needs to be made regarding which processing modes are to be used for one block. For example, the mode decision can be based on test results of applying different processing modes on one block. The test results can be evaluated based on rate-distortion performance of respective processing modes. A processing mode having a best result can be determined as the choice for processing the block. In alternative examples, other methods or algorithms can be employed to determine a processing mode. For example, characteristics of a picture and blocks partitioned from the picture may be considered for determination of a processing mode.

The first adder 131 receives a prediction of a current block from either the intra prediction module 110 or the motion compensation module 121, and the current block from the input video data 101. The first adder 131 can then subtract the prediction from pixel values of the current block to obtain a residue of the current block. The residue of the current block is transmitted to the residue encoder 132.

The residue encoder 132 receives residues of blocks, and compresses the residues to generate compressed residues. For example, the residue encoder 132 may first apply a transform, such as a discrete cosine transform (DCT), wavelet transform, and the like, to received residues corresponding to a transform block and generate transform coefficients of the transform block. Partition of a picture into transform blocks can be the same as or different from partition of the picture into prediction blocks for inter or intra prediction processing. Subsequently, the residue encoder 132 can quantize the coefficients to compress the residues. The compressed residues (quantized transform coefficients) are transmitted to the residue decoder 133 and the entropy encoder 141.

The residue decoder 133 receives the compressed residues and performs an inverse process of the quantization and transformation operations performed at the residue encoder 132 to reconstruct residues of a transform block. Due to the quantization operation, the reconstructed residues are similar to the original resides generated from the adder 131 but typically are not the same as the original version.

The second adder 134 receives predictions of blocks from the intra prediction module 110 and the motion compensation module 121, and reconstructed residues of transform blocks from the residue decoder 133. The second adder 134 subsequently combines the reconstructed residues with the received predictions corresponding to a same region in the picture to generate reconstructed video data. The reconstructed video data can be stored into the decoded picture buffer 151 forming reference pictures that can be used for the inter prediction operations.

The entropy encoder 141 can receive the compressed residues from the residue encoder 132, and the motion information 103 from the inter prediction module 120. The entropy encoder 141 can also receive other parameters and/or control information, such as intra prediction mode information, quantization parameters, and the like. The entropy encoder 141 encodes the received parameters or information to form the bitstream 102. The bitstream 102 including data in a compressed format can be transmitted to a decoder via a communication network, or transmitted to a storage device (e.g., a non-transitory computer-readable medium) where video data carried by the bitstream 102 can be stored.

Figure 2:
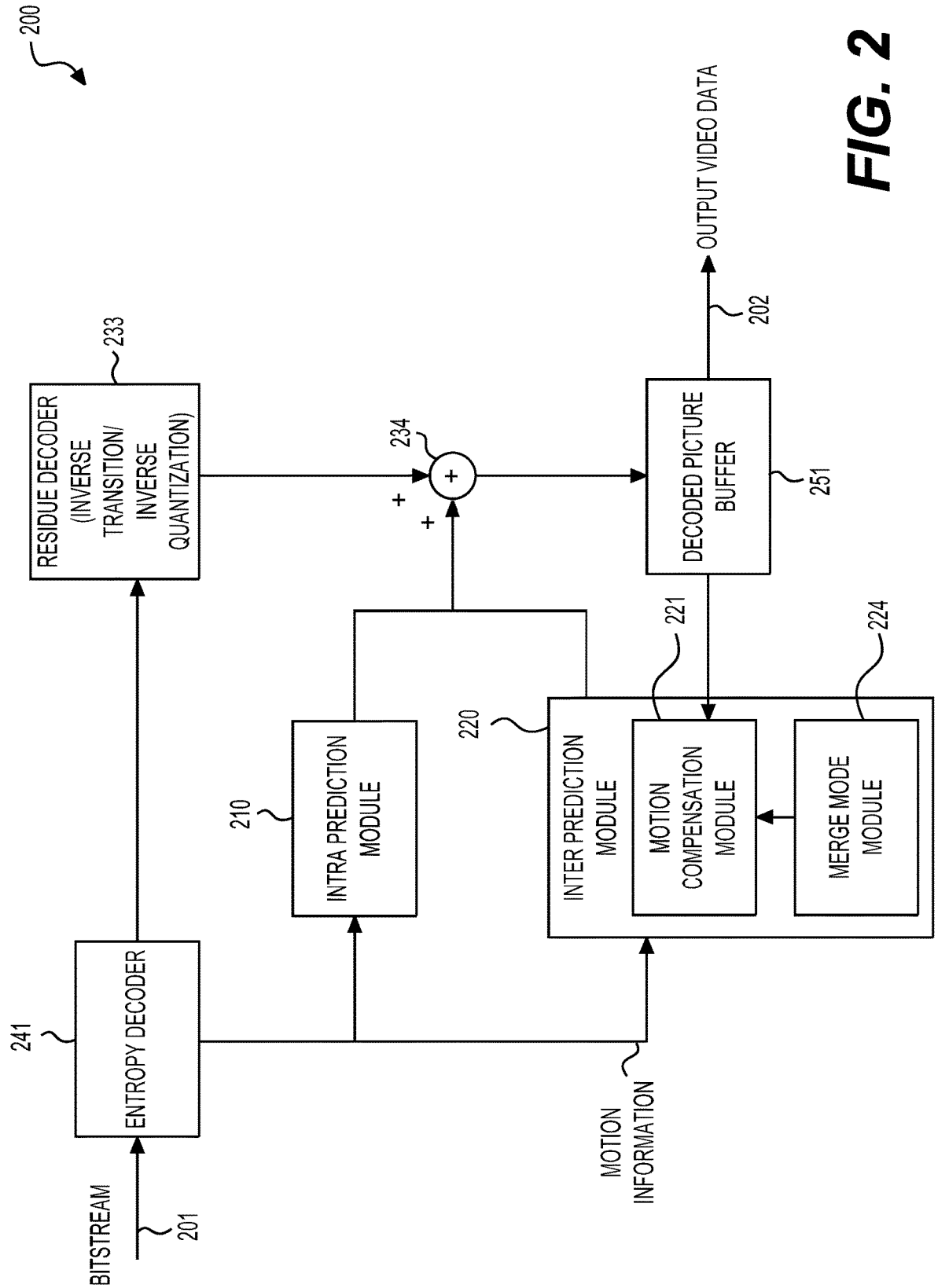
FIG. 2 shows an example video decoder according to an embodiment of the disclosure.

FIG. 2 shows an example video decoder 200 according to an embodiment of the disclosure. The decoder 200 can include an entropy decoder 241, an intra prediction module 210, an inter prediction module 220 that includes a motion compensation module 221 and a merge mode module 224, a residue decoder 233, an adder 234, and a decoded picture buffer 251. Those components are coupled together as shown in FIG. 2. In one example, the decoder 200 receives a bitstream 201 from an encoder, such as the bitstream 102 from the encoder 100, and performs a decompression process to generate output video data 202. The output video data 202 can include a sequence of pictures that can be displayed, for example, on a display device, such as a monitor, a touch screen, and the like.

Similarly to the encoder 100 in FIG. 1 example, the decoder 200 can employ the adaptive candidate approach to process a current block that is encoded with merge mode. For example, the decoder 200 can be configured to determine a set of candidate positions for the current block in a way the same as the encoder 100 determines the same set of candidate positions when encoding the current block. Specifically, number and location of the candidate positions can be determined according to a size and/or shape of the current block. Subsequently, the decoder 200 can construct a candidate list in a way the same as the encoder 100 constructs the same candidate list when encoding the current block. Based on a merge index associated with the current block and received in the bitstream 201, a set of motion data can be determined. The above process of deriving the set of motion data can be performed at the merge mode module 224.

The entropy decoder 241 receives the bitstream 201 and performs a decoding process which is an inverse process of the encoding process performed by the entropy encoder 141 in FIG. 1 example. As a result, motion information 203, intra prediction mode information, compressed residues, quantization parameters, control information, and the like, are obtained. The compressed resides can be provided to the residue decoder 233.

The intra prediction module 210 can receive the intra prediction mode information and accordingly generate predictions for blocks encoded with intra prediction mode. The inter prediction module 220 can receive the motion information 203 from the entropy decoder 241, and accordingly generate predictions for blocks encoded with inter prediction with inter mode, inter prediction with merge mode, or inter prediction with skip mode. For example, for a block encoded with inter mode, a set of motion data corresponding to this block can be obtained from the motion information 203 and provided to the motion compensation module 221. For a block encoded with merge mode, a merge index can be obtained from the motion information 103, and the process of deriving a set of motion data based on the adaptive candidate position approach described herein can be performed at the merge mode module 224. The resulting motion data can be provided to the motion compensation module 221. Based on received motion data and reference pictures stored in the decoded picture buffer 251, the motion compensation module 221 can accordingly generate predictions for respective blocks which are provided to the adder 234.

The residue decoder 233, the adder 234 can be similar to the residue decoder 133 and the second adder 134 in the FIG. 1 example in terms of functions and structures. Particularly, for blocks encoded with skip mode, no resides are generated for those blocks. The decoded picture buffer 251 stores reference pictures useful for motion compensation performed at the motion compensation module 221. The reference pictures, for example, can be formed by reconstructed video data received from the adder 234. In addition, reference pictures can be obtained from the decoded picture buffer 251 and included in the output video data 202 for displaying to a display device.

In various embodiments, the merge modules 124 and 224 and other components of the encoder 100 and decoder 200 can be implemented with hardware, software, or combination thereof. For example, the merge modules 124 and 224 can be implemented with one or more integrated circuits (ICs), such as an application specific integrated circuit (ASIC), field programmable gate array (FPGA), and the like. For another example, the merge modules 124 and 224 can be implemented as software or firmware including instructions stored in a computer readable non-volatile storage medium. The instructions, when executed by a processing circuit, causing the processing circuit to perform functions of the merge modules 124 or 224.

It is noted that the merge modules 124 and 224 implementing the adaptive candidate position approach disclosed herein can be included in other decoders or encoders that may have similar or different structures from what is shown in FIG. 1 or FIG. 2. In addition, the encoder 100 and decoder 200 can be included in a same device, or separate devices in various examples.

FIGS. 3A-3C show a first tree-based partitioning schemes for partitioning a picture according to an embodiment of the disclosure. The first tree-based partitioning scheme is based on a quadtree structure and can be used in HEVC standards. As an example, as specified in the HEVC standards, a picture can be partitioned into slices, and a slice can be further partitioned into coding tree blocks (CTB). A CTB can have a square shape of size 8×8, 16×16, 32×32, or 64×64. A CTB can be partitioned into coding blocks (CB) using the quadtree structure.

FIG. 3A shows an example of a CTB 301 that is partitioned into multiple CBs. FIG. 3B shows a quadtree 302 corresponding to a process of partitioning the CTB 301. As shown, the CTB 301 is a root 311 of the quadtree 302, and leaf nodes of the quadtree 302 (such as a leaf node 331) correspond to CBs in the CTB 301. Other nodes (except leaf nodes and the root) of the quadtree 302 (such as a node 321) correspond to parent blocks which are partitioned into child blocks. Sizes of resulting CBs from a partitioning process can be adaptively determined according to local content of a picture including the CTB 301. Depth of the quadtree 302 and a minimum size of CBs can be specified in a syntax element of a bit stream carrying the coded picture.

As specified in the HEVC standards, a CB can be further partitioned once to form prediction blocks (PB) for purpose of intra or inter prediction processing. FIG. 3C shows 8 PB partitioning types as allowed in the HEVC standards. As shown, a CB can be split into 1, 2 or 4 PBs. In the FIG. 3C, width and height of a resulting PB are shown below each respective CB where M represents a side length of each CB in terms of pixels.

Figure 4A:
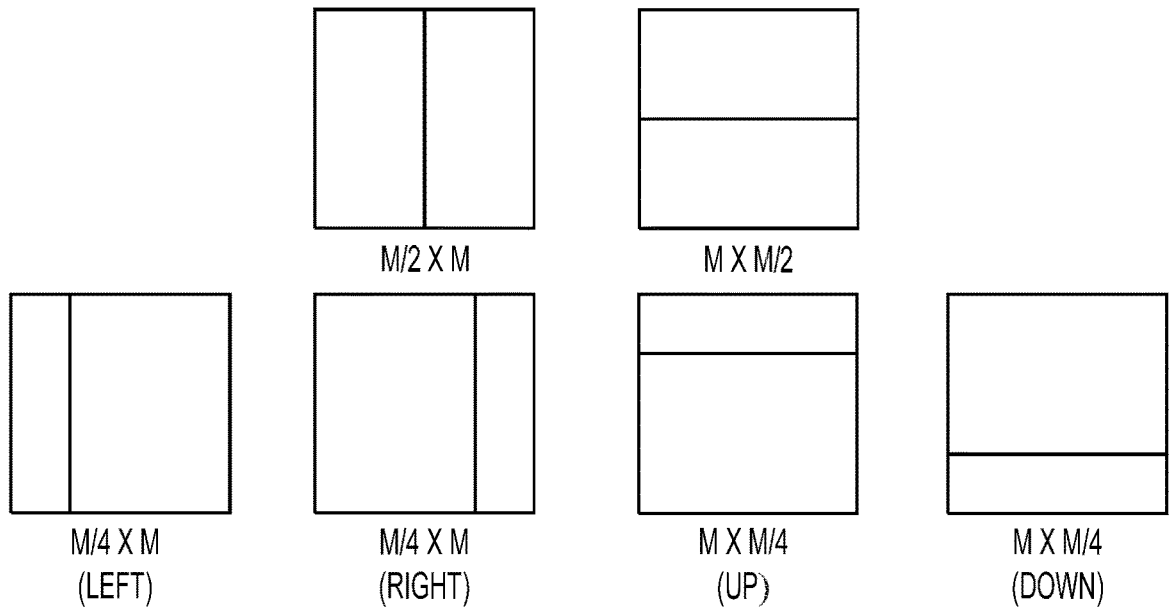
FIGS. 4A-4C show a second tree-based partitioning schemes for partitioning a picture according to an embodiment of the disclosure.
Figure 4B:
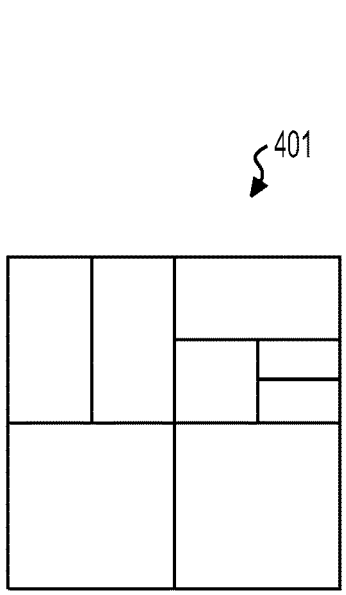
Figure 4C:
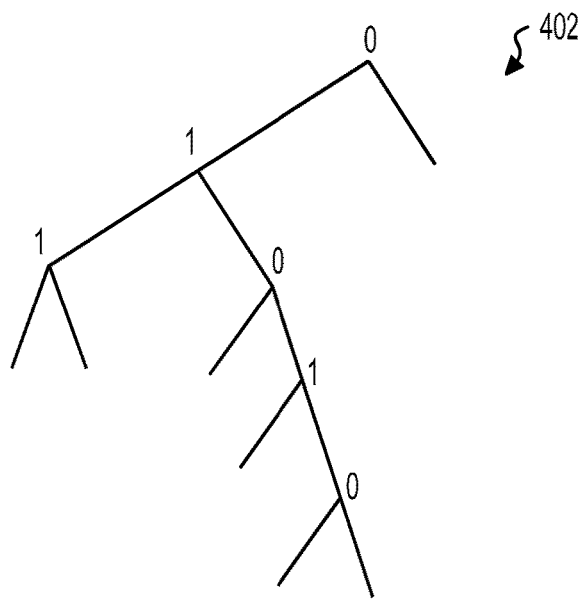

FIGS. 4A-4C show a second tree-based partitioning schemes for partitioning a picture according to an embodiment of the disclosure. The second tree-based partitioning scheme is based on a binary tree structure and can be used to partition a CTB defined in HEVC standards. FIG. 4A shows 6 partitioning types that can be used for splitting a block into a smaller block. Similar to FIG. 3C, width and height of a resulting sub-block are shown below each respective block where M represents a side length of each block in terms of pixels. A CTB can be split recursively using the partitioning types shown in FIG. 4A until a width or height of a resulting sub-block reaches a predefined minimum block width or height specified in one example.

FIG. 4B shows an example of a CTB 401 that is partitioned into CBs using the binary tree structure. FIG. 4C shows a binary tree 402 corresponding to a process for partitioning the CTB 401. In FIG. 4B and FIG. 4C examples, only the symmetric vertical and horizontal partitioning types (M/2×M and M×M/2) are used. At each non-leaf node of the binary tree 402, a flag (0 or 1) is labeled to denote whether horizontal or vertical partitioning is used: 0 indicates a horizontal splitting, and 1 indicates a vertical splitting. Each lead node of the binary tree 402 represents a resulting CB. The resulting CBs can be used as PBs without further splitting in some examples.

FIGS. 5A-5B show a third tree-based partitioning schemes for partitioning a picture according to an embodiment of the disclosure. The third tree-based partitioning scheme is based on a hybrid quadtree plus binary tree (QTBT) structure and can be used to partition a CTB defined in HEVC standards. FIG. 5A shows an example of a CTB 501 that is partitioned using the QTBT structure. In FIG. 5A, solid lines represent boundaries of blocks partitioned based on quadtree structure while dashed lines represent boundaries of blocks partitioned based on binary tree structure. FIG. 5B shows a tree 502 having a QTBT structure. The tree 502 corresponds to a process for partitioning the CTB 501. Solid lines represent partitioning based on quadtree structure while dashed lines represent partitioning based on binary tree structure.

As shown, during a QTBT based partitioning process, a CTB can be first partitioned using a quadtree structure recursively until a size of resulting blocks reaches a predefined minimum leaf node size. Thereafter, if a leaf quadtree block is not larger than a maximum allowed binary tree root node size, the leaf quadtree block can be further split based on the binary tree structure. The binary splitting can be iterated until a width or height of resulting blocks reaches a minimum allowed width or height, or until the binary tree depth reaches a maximum allowed depth. The resulting CBs (leaf blocks) generated from the QTBT based partitioning process can be used as PBs without further splitting in some examples.

FIG. 6 shows a first conventional method 600 for defining candidate positions for merge mode processing. The conventional method 600 is adopted in HEVC standards. As shown, a PB 610 is to be processed with merge mode. A set of candidate positions {A0, A1, B0, B1, B2, T0, T1} are defined for the merge mode processing. Specifically, candidate positions {A0, A1, B0, B1, B2} are spatial candidate positions that represent positions of candidate blocks that are in the same picture as the PB 610. In contrast, candidate positions {T0, T1} are temporal candidate positions that represent positions of candidate blocks that are in a reference picture. The candidate position T1 is near the central of the collocated block of the PB 610.

In FIG. 6, each candidate position is represented by a block of samples, for example, having a size of 4×4 samples. A size of such a block corresponding to a candidate position can be equal to or smaller than a minimum allowed size of PBs (e.g., 4×4 samples) defined for a tree-based partitioning scheme used for generating the PB 610. Under such configuration, a block representing a candidate position can always be covered within a single neighboring PB. In alternative example, a sample position may be used to represent a candidate position.

In one example, based on the candidate positions {A0, A1, B0, B1, B2, T0, T1} defined in FIG. 6, a merge mode process can be performed to select a candidate block from the candidate positions {A0, A1, B0, B1, B2, T0, T1}. In the merge mode process, a candidate list construction process can first be performed to construct a candidate list. The candidate list can have a predefined maximum number of merge candidates, C. Each merge candidate in the candidate list can be a set of motion data that can be used for motion-compensate prediction. In one example, according to a predefined order, a first number of merge candidate, C1, is derived from the spatial candidate positions {A0, A1, B0, B1, B2}, and a second number of merge candidate, C2=C−C1, is derived from the temporal candidate positions {T0, T1}.

In some scenarios, a merge candidate at a candidate position may be unavailable. For example, a candidate block at a candidate position can be intra-predicted, or a candidate block is outside of a slice including the current PB 610 or is not in a same CTB row as the current PB 610. In some scenarios, a merge candidate at a candidate position may be redundant. For example, a same neighboring block of the PB 610 can overlap with two candidate positions. The redundant merge candidate can be removed from the candidate list. When a total number of merge candidates in the candidate list is smaller than the maximum number of merge candidate C, additional merge candidates can be generated (for example, according to a preconfigured rule) to fill the candidate list such that the candidate list can be maintained to have a fixed length.

After the candidate list is constructed, at an encoder, such as the encoder 100, an evaluation process can be performed to select a best merge candidate from the candidate list. For example, rate-distortion performance corresponding to each merge candidate can be calculated, and the one with the best rate-distorting performance can be selected. Accordingly, a merge index associated with the selected merge candidate can be determined for the PB 610 and signaled to a decoder.

At a decoder, such as the decoder 200, after receiving the merge index of the PB 610, a similar candidate list construction process as described above can be performed. After a candidate list is constructed, a merge candidate can be selected from the candidate list based on the received merge index without performing any evaluations in some examples. Motion data of the selected merge candidate can be used for subsequent motion-compensated prediction of the PB 610.

Figure 7:
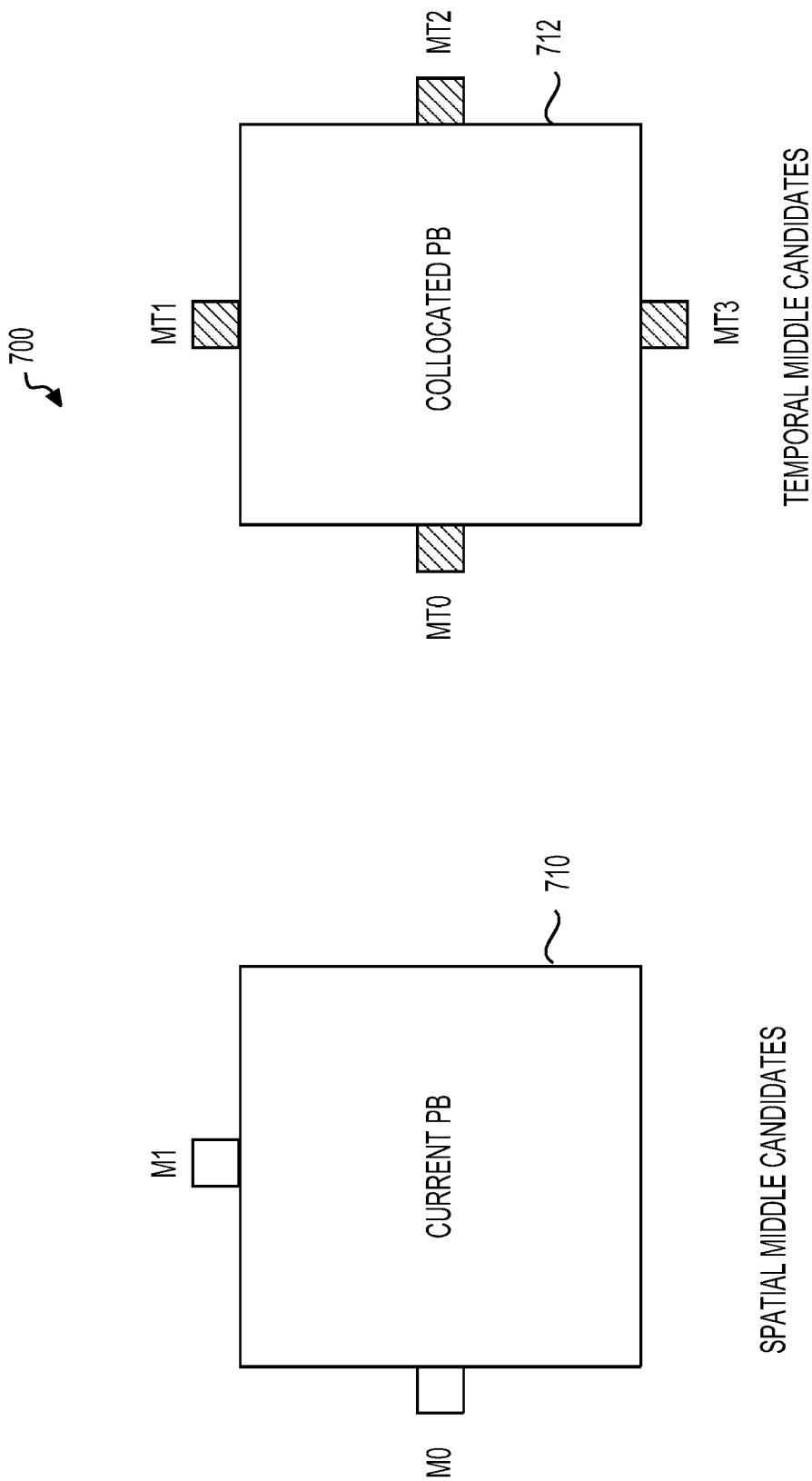
FIG. 7 shows a second conventional method for defining candidate positions for merge mode processing.

FIG. 7 shows a second conventional method 700 for defining candidate positions for merge mode processing. In the method 700, candidate positions can be defined to be located around middle locations of PB sides. The middle candidate positions can include a set of spatial candidate positions {M0, M1} at a left and a top side of a current PB 710 as shown at the left side of FIG. 7. The middle candidate positions can further include a set of temporal candidate positions {MT0, MT1, MT2, MT3} distributed at each side of a collocated PB 712 in a reference picture. In some examples, the middle candidate positions {M0, M1, MT0, MT1, MT2, MT3} can be used in combination with the corner candidate positions {A0, A1, B0, B1, B2, T0} and the central candidate position {T1} defined in FIG. 6 example.

As can be seen from the examples of tree structure based partitioning schemes described with reference to FIGS. 3A-3C, 4A-4C, 5A-5B, the resulting PBs can have variable sizes and shapes during a picture encoding process. When the conventional merge candidate position definition methods 600 and 700 are used for merge mode processing, candidate positions are defined to be at a fixed set of locations without considering a size or shape of a current PB. In contrast, the adaptive candidate position approach defines location and number of candidate positions according to a shape and/or size of a current PB. Compared with the adaptive candidate position approach, the conventional methods can have a higher risk that a best candidate block is not included in the candidate positions, thus reducing performance of a coding system.

FIGS. 8A-8B and 9A-9B show a first example of the adaptive candidate position approach according to an embodiment of the disclosure. In the first example, number of candidate positions of a PB can be defined according to a size of the PB. For example, the larger the size of the PB, the more the number of candidate positions could be. The size of the PB can be indicated by a height and a width of the PB. In one example, the PB size is defined to be PB height×PB width.

Specifically, number of candidate positions along a PB side can be defined according to a length of the PB side. In other words, the number of candidate positions along a PB side is a function of a side length of the PB. For example, the longer the PB side, the more the candidate positions along the PB side can be. For example, a certain number of candidate positions can be defined corresponding to a side length within a certain range. For example, for a side length of 4 pixels, the candidate position number can be 0. For a side length within a range of 8 pixels to 16 pixels, one candidate position can be defined. For a side length within a range of 20 pixels to 32 pixels, two candidate positions can be defined. Based on the numbers of candidate positions defined for PBs with different sizes, locations of the candidate positions can be defined accordingly for the PBs with different sizes.

Based on the above definition, during an encoding or decoding process, when a current PB is to be processed with merge mode, an encoder or decoder can determine number and locations of candidate positions according to a size of the current PB. For example, based on the function between a number of candidate positions and a side length, the encoder or decoder can determine a number of candidate positions along a side of the current PB. After the number of candidate positions along the side is determined, locations of those candidate positions along the side can be determined subsequently.

Figure 8A:
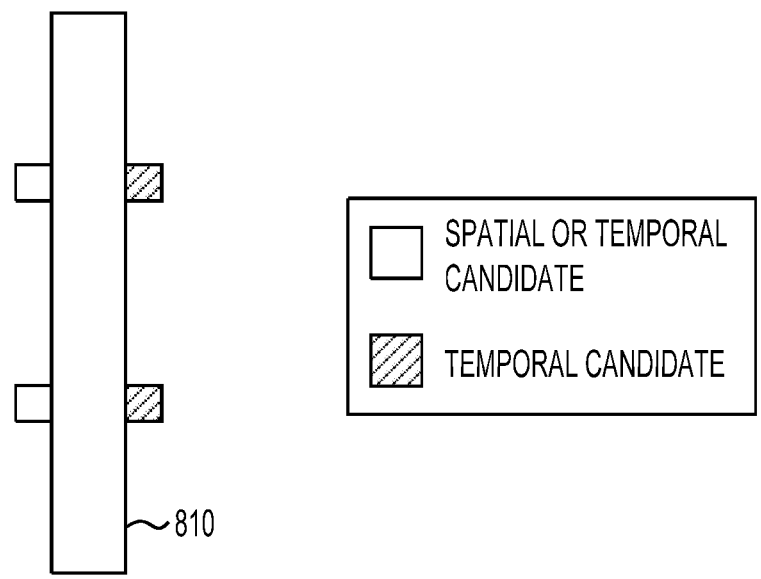
FIGS. 8A-8B and 9A-9B show a first example of the adaptive candidate position approach according to an embodiment of the disclosure.
Figure 8B:
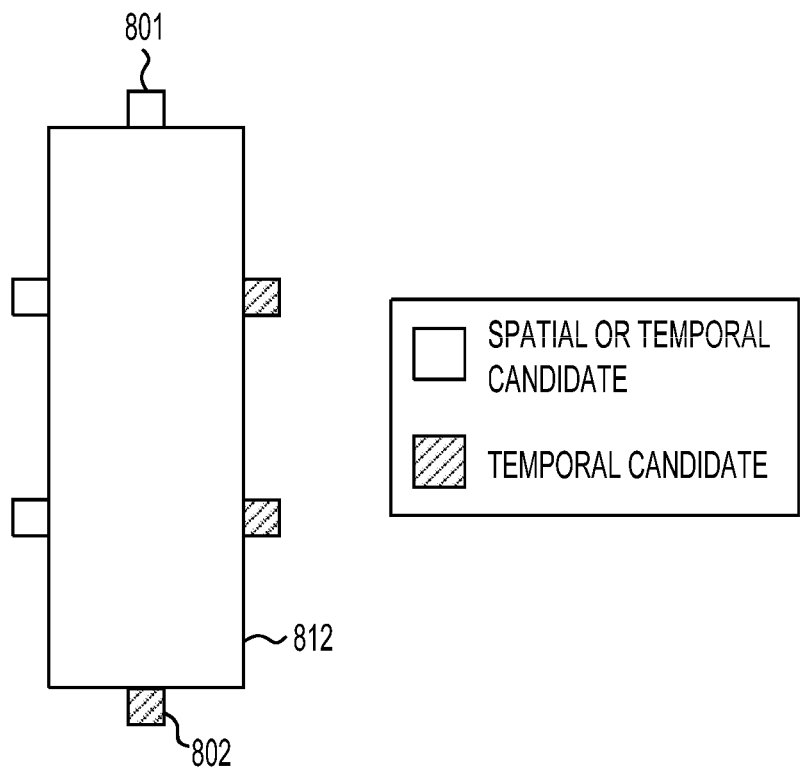

FIG. 8A shows a PB 810 having two candidate positions at a left side each representing a spatial candidate position or a temporal candidate position, and two temporal candidate positions at a right side. No candidate positions are defined on a top or bottom side of the PB 810 due to a short top/bottom side length, for example, 4 pixels. In contrast, FIG. 8B shows a PB 812 that has a same height as the PB 810, and a similar number of candidate positions on a left or right side of the PB 812 as the PB 810. However, a top or bottom side of the PB 812 is longer than that of the PB 810. For example, the top and bottom sides can have a length of 16 pixels. Accordingly, a candidate position 801 representing a spatial or a temporal candidate position is defined on the top side while a candidate position 802 representing a temporal candidate position is defined on the bottom side.

Figure 9A:
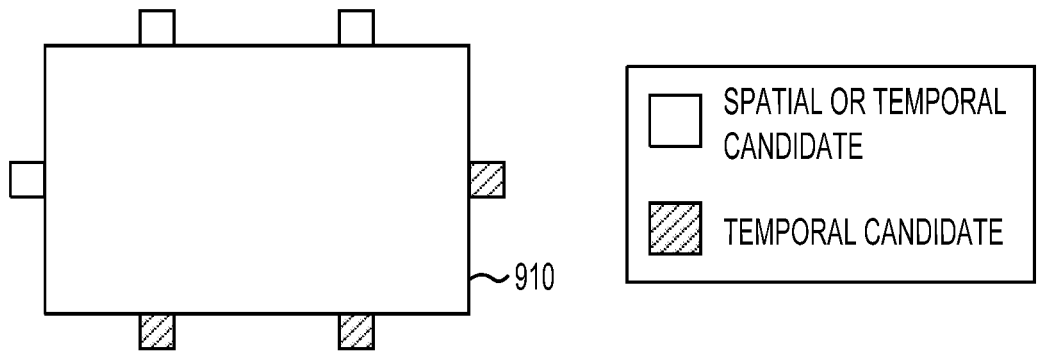
Figure 9B:
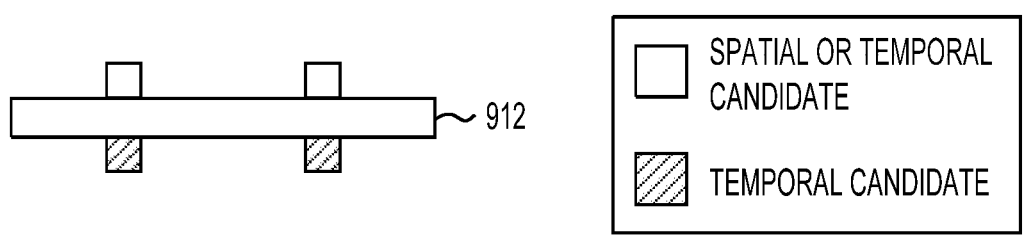

FIG. 9A and FIG. 9B show two PBs 910 and 912 that have a same width but different heights. For example, the height of PB 910 is 24 pixels, and the height of PB 912 is 4 pixels. Accordingly, a same number of candidate positions are defined for the PBs 910 and 912 on the top or bottom side, while different number of candidate positions is defined for PBs 910 and 912 on the right or left side. Specifically, the left or right side of the PB 912 has zero number of candidate positions, while the left or right side of the PB 910 each has one candidate position. The left side candidate position represents a spatial and a temporal candidate position.

Figure 10A:
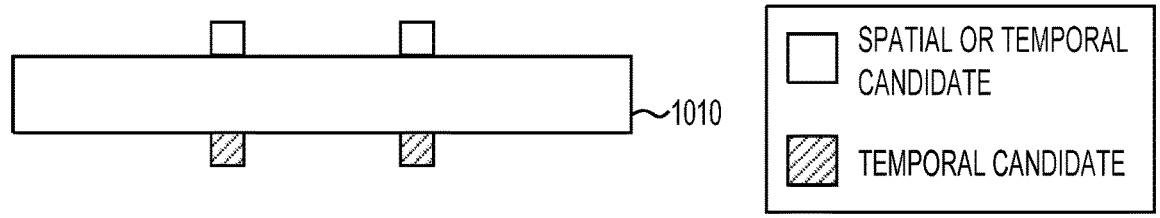
FIGS. 10A-10C show a second example of the adaptive candidate position approach according to an embodiment of the disclosure.
Figure 10B:
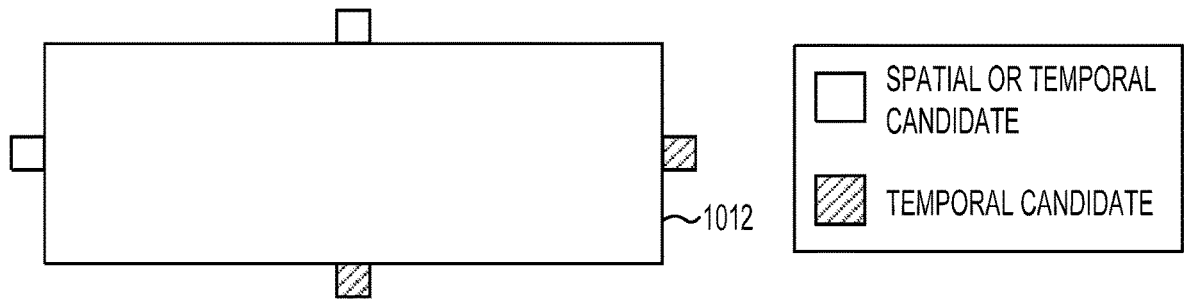
Figure 10C:
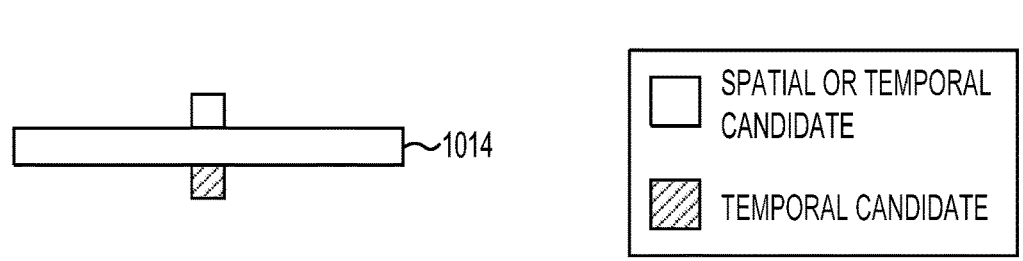

FIGS. 10A-10C show a second example of the adaptive candidate position approach according to an embodiment of the disclosure. In the second example, number of candidate positions of a PB not only depends on a size, or a width or height of the PB but also depends on a shape of the PB. The PB shape can be indicated by a ratio between the width and height of the PB. For example, number of candidates along top or bottom side can be defined depending on the PB width (or PB size) and the width/height ratio.

For example, when a width/height ratio is above a threshold, number of candidate positions on a top side or left side can be different from when the width/height ratio is below the threshold. FIGS. 10A-10B show such an example. In FIG. 10A, a PB 1010 has two candidate positions along each of the top and bottom sides, and zero candidate position along the right or left side. In FIG. 10B, a PB 1012 has a same width as the PB 1010 but a longer height than the PB 1010. The width/height ratio of the PB 1012 is smaller than that of the PB 1010. Accordingly, one candidate position is defined for each of the top and bottom sides of the PB 1012 that is fewer than the two candidate positions defined for each of the top and bottom sides of the PB 1010. In addition, one candidate position is defined on each of the right and left sides of the PB 1012.

FIG. 10C shows a PB 1014 that has a same width/height ratio as the PB 1010. However, due to a smaller PB size, the PB 1014 has a different number of candidate positons. Specifically, the PB 1014 has one candidate position defined for each of the top and bottom sides that is fewer than two candidate positions defined for each of the top and bottom sides of the PB 1010.

Based on the above definition, during an encoding or decoding process, when a current PB is to be processed with merge mode, and encoder or decoder can determine number and locations of candidate positions according to a width/height ratio of the current PB as well as a size, width or height of the current PU.

Figure 11:
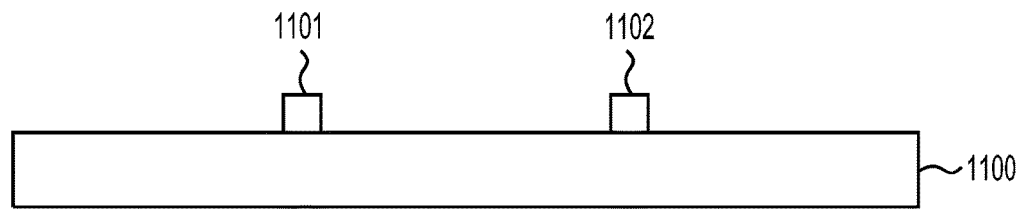
FIG. 11 shows a third example of the adaptive candidate position approach according to an embodiment of the disclosure.

FIG. 11 shows a third example of the adaptive candidate position approach according to an embodiment of the disclosure. In the third example, candidate positions are arranged along a PB side with an equal division placement method. In other words, candidate positions are defined to be at locations that substantially equally divide the PB side.

Based on the definition of the equal division placement method, in one example, the following process is performed at a video encoder or decoder to determine candidate positions along a side of a current PB.

At a first step, a number of candidate positions N can be determined according to a size and/or shape of the current PB, for example, using methods described in examples of FIGS. 8A-8B, 9A-9B, and 10A-10B.

At a second step, an initial location of a candidate position on the PB side can be determined. For example, the candidate position has an index i that is in a range of 0 to N−1, and a length of the PB side is represented as L. The location of the candidate position i can be determined according to the following expression, $(L/(N+1))*(i+1)$, an result of which is a distance between an end of the PB side and the location of the candidate position i in terms of pixels.

At a third step, based on the initial location, the candidate position i can be aligned to a predefined alignment position. For example, a minimum allowed side length of neighboring blocks of the current PB can be 4 pixels, and accordingly boundaries of neighboring blocks are aligned to positions that are multiples of 4 pixels. The candidate positions can be aligned to possible neighboring block boundaries.

At a fourth step, availability of the candidate position i is checked. For example, when a candidate block overlaps the candidate position i is intra coded, motion data would be unavailable at the candidate position i. The above second, third, and fourth steps can be repeated for each of the N candidate positions to determine locations of the N candidate positions.

In FIG. 11, a top side of a PB 1100 has a length L=64 pixels, and N=2 number of candidate positions 1101-1102 are to be determined along the top side. For the first candidate position 1101, an initial location can be determined to be $64/(2+1)=21.33$ pixels. Assuming alignment is required at multiples of 4 pixels, a final location can be determined to be 24 pixels which a distance from a left end of the top side. If the candidate position 1101 is represented by a 4×4 pixel array, the candidate position 1101 can be located at a location from 21 pixel to 24 pixel with respect to the left end of the top side of the PB 1100.

Figure 12:
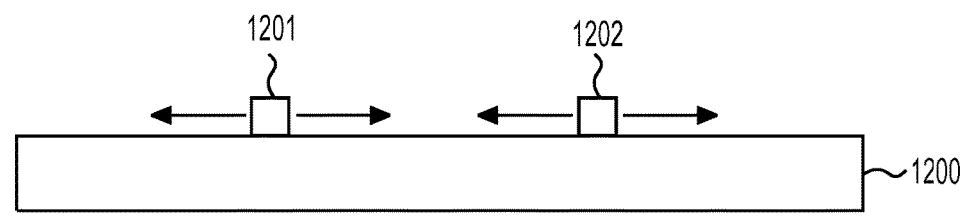
FIG. 12 shows a fourth example of the adaptive candidate position approach according to an embodiment of the disclosure.

FIG. 12 shows a fourth example of the adaptive candidate position approach according to an embodiment of the disclosure. In the fourth example, a process for determining locations of candidate positions can start with the equal division placement based process in FIG. 11 example. When a candidate position is determined to be unavailable at an aligned location, a refinement search process can be performed to search for available candidate positions around the unavailable candidate position. In one example, the refinement search process can start with a first aligned location to the left of the unavailable candidate position, then a first aligned location to the right, a second aligned location to the left, and so on, until an available candidate position is found, or all aligned locations have been searched. In alternative examples, different refinement search algorithms can be used.

In FIG. 12, two candidate positions 1201-1202 result from the equal division placement based determination process of FIG. 11 example, and are determined to be unavailable. Accordingly, the refinement search process can be performed around each of the unavailable candidate positions 1201-1202.

Figure 13:
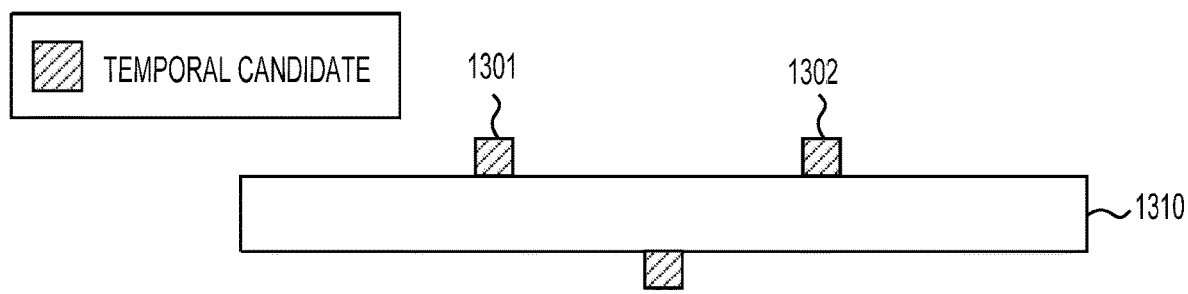
FIG. 13 shows a fifth example of the adaptive candidate position approach according to an embodiment of the disclosure.

FIG. 13 shows a fifth example of the adaptive candidate position approach according to an embodiment of the disclosure. In the fifth example, locations of candidate positions at two of opposite sides of a PB can be arranged in an interleaved manner. As shown in FIG. 13, a PB 1310 has two candidate positions 1301-1302 disposed on a top side, and one candidate position 1303 disposed on a bottom side. Particularly, the candidate position 1303 is disposed in the middle of the two candidate positions 1301-1302 in horizontal direction. Based on the above definition of interleaved placement method, an encoder or decoder can accordingly determine locations of respective candidate positions for merge mode processing.

In the above first to fifth examples of the adaptive candidate position approach, candidate positions are disposed along a side of a PB, thus can be referred to as side candidate positions in contrast to corner, central or middle candidate positions used in the two conventional methods for defining candidate positions in FIG. 6 and FIG. 7 example. In various examples, the side candidate positions can be used in combination with the corner or central candidate positions, or the middle candidate positions for merge mode processing. Or, the side candidate positions can be used independently. Please note that each temporal candidate position described in the foregoing examples is associated with a block surrounding, overlapping with, or within the collocated block of the current PB, and each spatial candidate position described in the foregoing examples is associated with a block surrounding the current PB.

Figure 14:
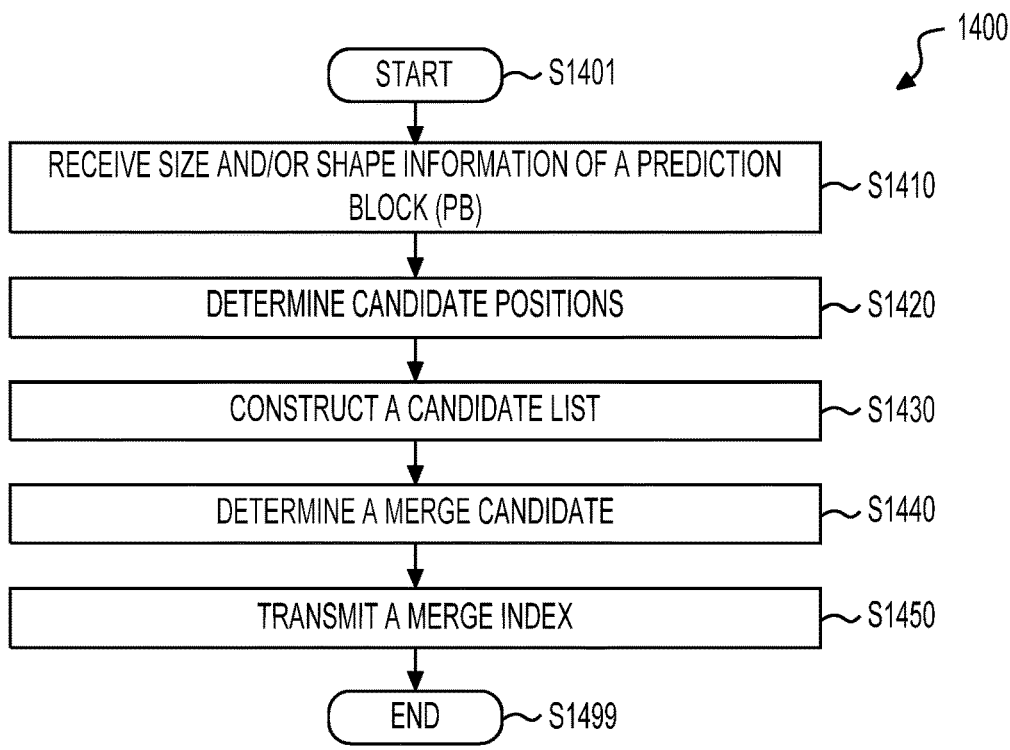
FIG. 14 shows a merge mode encoding process according to an embodiment of the disclosure.

FIG. 14 shows a merge mode encoding process 1400 according to an embodiment of the disclosure. The merge mode encoding process 1400 uses the adaptive candidate position approach for merge mode processing. The merge mode encoding process 1400 can be performed at the merge mode module 124 in the encoder 100 in FIG. 1 example. The encoder 100 is used for explanation of the merge mode encoding process 1400. The process 1400 can start from S1401 and proceed to S1410.

At S1410, size and/or shape information of a current PB is received. For example, a picture can be partitioned with a tree structure based partitioning method, and size and/or shape information of resulting PBs can be stored in a tree structure based data structure. When the current PB is to be processed with merge mode, the associated size and/or shape information can be passed to the merge mode module 124. The size information can include a width and a height of the current PB in terms of pixel numbers. The shape information can include a ratio of a width to a height or a height to a width, and optionally a height or a width of the current PB. The PB can be an array of pixels corresponding to luma component or chroma component in one example.

At S1420, candidate positions for the current PB can be determined for purpose of merge mode processing. Particularly, the adaptive candidate position approach can be used for the merge mode processing. Accordingly, number and locations of the candidate positions can be determined according to a size and/or a shape of the current PB. For example, the methods for determining a number and locations of candidate positions described with reference to FIGS. 8A-8B, 9A-9B, 10A-10C, and 11-13 can be employed depending on which method for defining candidate positions is used.

For example, a number of candidate positions along a side of the PB can be determined according to a length of the PB side. Or, a number of candidate positions along a side can be determined according to a width/height ratio in addition to the length of the PB side. For example, after a number of candidate positions of the PB is determined, locations of the candidate positions can be determined. When the equal division placement method is used, the merge mode module 124 can accordingly determine locations of the candidate positions. For example, steps of the four-step process described in FIG. 11 example can be performed to determine locations of candidate positions on a PB side. Optionally, the refinement search process in FIG. 12 example can be performed to search for additional candidate positions around unavailable candidate positions. When the interleave placement method is used, the merge module 124 can determine locations of candidate positions of the PB accordingly. A refinement search process can be performed afterwards.

At S1430, a candidate list can be constructed based on the candidate positions determined at S1420. For example, a set of spatial candidate positions and a set of temporal candidate positions can be selected from the candidate positions determined at S1420 for constructing the candidate list. The selection may consider whether a candidate position is available or redundant. Motion data corresponding to the selected candidate positions is included in the candidate list. To be specific, the motion data corresponding to a selected spatial candidate position may comprise the motion vector, reference picture index, prediction direction or other information of a specific spatial neighboring block of the current PB. The specific spatial neighboring block is located at the position identical to the selected spatial candidate position and is in the current picture comprising the current PB. The motion data corresponding to a selected temporal candidate position may comprise the motion vector, reference picture index, prediction direction or other information of a specific temporal neighboring block of a collocated block of the current PB, in which the specific temporal neighboring block is in a reference picture of the current PB and the location of the specific temporal neighboring block is at the position identical to the selected temporal candidate position. If members of the resulting candidate list are less than a preconfigured length of the candidate list, additional motion data can be created. In various examples, processes for construction a candidate list can vary.

At S1440, a merge candidate can be determined. For example, members (motion data) of the candidate list can be evaluated, for example, using a rate-distortion optimization based method. A best set of motion data can be determined, or a set of motion data with a performance above a threshold can be identified. Accordingly, a merge index indicating position of the determined motion data in the candidate list can be determined.

At S1450, the merge index can be transmitted from the encoder 100 to a decoder. The process 1400 proceeds to S1499 and terminates at S1499.

Figure 15:
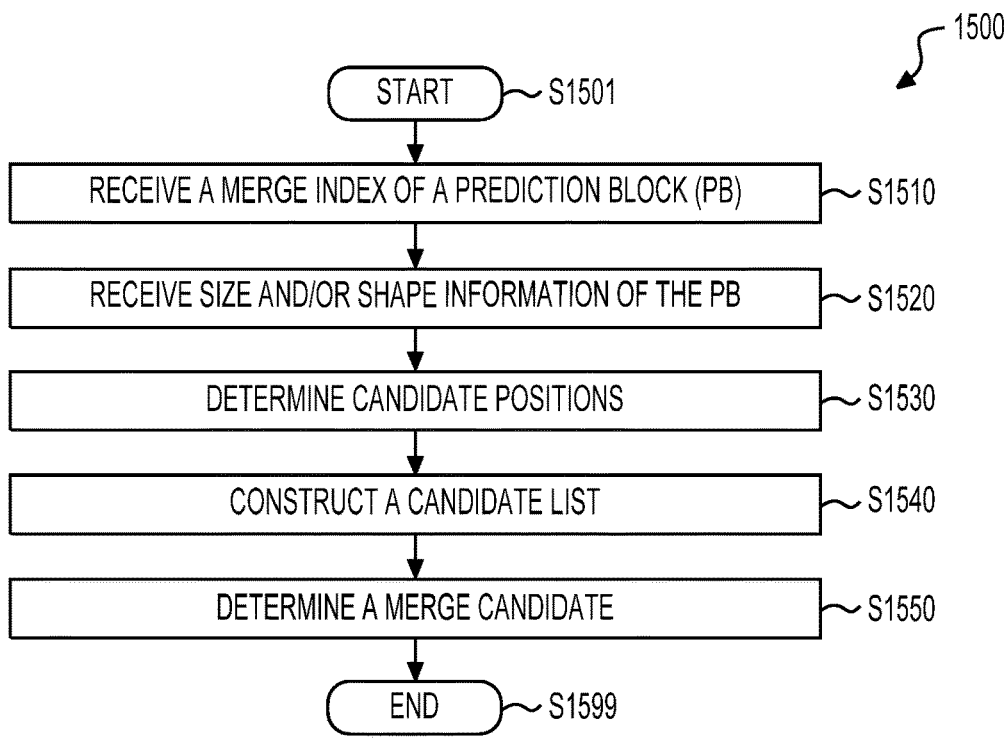
FIG. 15 shows a merge mode decoding process according to an embodiment of the disclosure.

FIG. 15 shows a merge mode decoding process 1500 according to an embodiment of the disclosure. The merge mode decoding process 1500 uses the adaptive candidate position approach for merge mode processing. The merge mode decoding process 1500 can be performed at the merge mode module 224 in the decoder 200 in FIG. 2 example. The decoder 200 is used for explanation of the merge mode decoding process 1500. The process 1500 can start from S1501 and proceed to S1510.

At S1510, a merge index of current PB can be received. The current PB can be encoded using the adaptive candidate position at a video encoder. For example, the PB is associated with a merge flag indicating the PB is encoded with merge mode. The merge flag and merge index can be associated with the PB and carried in the input bitstream 201.

At S1520, size and/or shape information of the current PB can also be received. For example, the size information can include a height or width of the current PB, and carried in the input bit stream 201. The shape information can include a ratio of a width to a height or a height to a width, and optionally a height or a width of the current PB.

At S1530, candidate positions can be determined based on the size information of the PB in a way similar to what is performed at S1420. For example, corresponding to definitions for defining the candidate positions, corresponding methods for determining number and locations of the candidate positions, such as the methods described with reference to FIGS. 8A-8B, 9A-9B, 10A-10C, and 11-13, can be employed.

At S1540, a candidate list can be constructed based on the candidate positions determined at S1530 in a way similar as S1430.

At S1550, a merge candidate of the current PB can be determined based on the candidate list and the received merge index. The merge candidate includes a set of motion data that can be subsequently used for generate a prediction of the current PB at the motion compensation module 221. The process 1500 proceeds to S1599 and terminates at S1599.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. A computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for video coding, comprising:
receiving a current block of a picture;
determining a number of merge candidate positions for constructing a merge candidate list corresponding to the current block according to a size of the current block, wherein the merge candidate positions are positions of spatial or temporal merge candidates, and the step of determining the number of the merge candidate positions comprises:
in response to the size of the current block being not larger than a predetermined size, determining the number of the merge candidate positions for constructing the merge candidate list corresponding to the current block to be zero;
identifying the merge candidate positions on sides of the current block in accordance with the number of the merge candidate positions; and
constructing the merge candidate list corresponding to the current block based on motion data associated with the identified merge candidate positions.

2. The method of claim 1, wherein the size of the current block is a product of a height of the current block and a width of the current block.

3. The method of claim 1, wherein the predetermined size is 4×4 samples.

4. A method for video coding, comprising:
receiving a current block of a picture;
determining a merge candidate list configuration for the current block according to a size of the current block, wherein the merge candidate list configuration comprises a spatial or temporal merge candidate number for constructing a merge candidate list corresponding to the current block and a spatial or temporal merge candidate position, and the step of determining the merge candidate list configuration comprises:
in response to the size of the current block being not larger than a predetermined size, determining the spatial or temporal merge candidate number for constructing the merge candidate list corresponding to the current block as zero, and
identifying the spatial or temporal merge candidate position on sides of the current block in accordance with the spatial or temporal merge candidate number; and
constructing the merge candidate list corresponding to the current block based on motion data associated with the merge candidate list configuration.

5. The method of claim 4, wherein the size of the current block is a product of a height of the current block and a width of the current block.

6. The method of claim 4, wherein the predetermined size is 4×4 samples.

7. An apparatus for video coding, comprising circuitry configured to:
receive a current block of a picture;
determine a number of merge candidate positions for constructing a merge candidate list corresponding to the current block according to a size of the current block, wherein the merge candidate positions are positions of spatial or temporal merge candidates, and the step of determining the number of the merge candidate positions comprises:
in response to the size of the current block being not larger than a predetermined size, determining the number of the merge candidate positions for constructing the merge candidate list corresponding to the current block to be zero;
identify the merge candidate positions on sides of the current block in accordance with the number of the merge candidate positions; and construct the merge candidate list corresponding to the current block based on motion data associated with the identified merge candidate positions.

8. The apparatus of claim 7, wherein the size of the current block is a product of a height of the current block and a width of the current block.

9. The apparatus of claim 7, wherein the predetermined size is 4×4 samples.

10. An apparatus for video coding, comprising circuitry configured to:
receive a current block of a picture;
determine a merge candidate list configuration for the current block according to a size of the current block, wherein the merge candidate list configuration comprises a spatial or temporal merge candidate number for constructing a merge candidate list corresponding to the current block and a spatial or temporal merge candidate position, and the step of determining the merge candidate list configuration comprises:

in response to the size of the current block being not larger than a predetermined size, determining the spatial or temporal merge candidate number for constructing the merge candidate list corresponding to the current block to be zero, and identifying the spatial or temporal merge candidate position on sides of the current block in accordance with the spatial or temporal merge candidate number; and construct the merge candidate list corresponding to the current block based on motion data associated with the merge candidate list configuration.

11. The apparatus of claim 10, wherein the size of the current block is a product of a height of the current block and a width of the current block.

12. The apparatus of claim 10, wherein the predetermined size is 4×4 samples.

* * * * *